United States Patent
Xu (10) Patent No.: US 11,212,639 B2
(45) Date of Patent: Dec. 28, 2021

(54) INFORMATION DISPLAY METHOD AND APPARATUS

(71) Applicant: Advanced New Technologies Co., Ltd., George Town (KY)

(72) Inventor: Dafeng Xu, Hangzhou (CN)

(73) Assignee: Advanced New Technologies Co., Ltd., George Town (KY)

(*) Notice: Subject to any disclaimer, the term of this patent is extended or adjusted under 35 U.S.C. 154(b) by 0 days.

(21) Appl. No.: 16/597,459

(22) Filed: Oct. 9, 2019

(65) Prior Publication Data

US 2020/0053506 A1 Feb. 13, 2020

Related U.S. Application Data

(63) Continuation of application No. PCT/CN2018/098249, filed on Aug. 2, 2018.

(30) Foreign Application Priority Data

Aug. 4, 2017 (CN) .......................... 201710662516.6

(51) Int. Cl.
*H04W 4/021* (2018.01)
*H04W 4/02* (2018.01)
*G06Q 30/02* (2012.01)

(52) U.S. Cl.
CPC ........ *H04W 4/021* (2013.01); *G06Q 30/0224* (2013.01); *H04W 4/026* (2013.01)

(58) Field of Classification Search
None
See application file for complete search history.

(56) References Cited

U.S. PATENT DOCUMENTS 6,657,661 B1* 12/2003 Cazier ................ H04N 1/00127
348/231.2
7,031,728 B2* 4/2006 Beyer, Jr. .............. H04W 4/029
455/456.3

(Continued)

FOREIGN PATENT DOCUMENTS

CN 102081672 6/2011
CN 102985901 3/2013

(Continued)

OTHER PUBLICATIONS

PCT International Preliminary Report on Patentability in International Application No. PCT/CN2018/098249, dated Feb. 4, 2020, 5 pages (with partial English translation).

(Continued)

*Primary Examiner* — Bhavesh V Amin
(74) *Attorney, Agent, or Firm* — Fish & Richardson P.C.

(57) ABSTRACT

One or more implementations shown in the present specification provide an information display method. An image capturing direction of an end-user device is determined. When the end-user device captures a first image, a geographic location of the end-user device is determined. Based on the geographic location and the image capturing direction of the end-user device and a geographic location of at least one point of interest (POI), a first POI that the end-user device points to when capturing the first image is determined. Using the geographic location of the end-user device as an origin of a coordinate system, a space model is established. Based on the space model, coordinates of a virtual camera is determined. Labeled data corresponding to the first POI are rendered onto the first image by using a second image simulated by the virtual camera.

17 Claims, 7 Drawing Sheets

(56) References Cited

U.S. PATENT DOCUMENTS

| | | | | |
|---|---|---|---|---|
| 7,405,746 B2* | 7/2008 | Wakimoto | G01C 21/3602 | 348/113 |
| 7,557,736 B1* | 7/2009 | Daily | G01C 21/20 | 340/995.1 |
| 7,728,869 B2* | 6/2010 | Jung | G01C 21/3679 | 348/113 |
| 7,826,967 B2* | 11/2010 | Jung | G01C 21/3679 | 348/231.1 |
| 7,974,781 B2* | 7/2011 | Emoto | G01C 21/3638 | 340/995.17 |
| 8,086,071 B2* | 12/2011 | Chen | G06T 15/205 | 345/421 |
| 8,164,599 B1* | 4/2012 | Kadous | G01C 21/20 | 345/634 |
| 8,239,130 B1* | 8/2012 | Upstill | G01C 21/3679 | 701/400 |
| 8,466,894 B2* | 6/2013 | Sugita | G06F 3/012 | 345/173 |
| 8,488,021 B2* | 7/2013 | Yang | H04N 5/77 | 348/231.1 |
| 8,566,014 B1 | 10/2013 | Kozolchyk et al. | | |
| 8,818,706 B1* | 8/2014 | Ogale | G01C 21/206 | 340/539.1 |
| 8,825,384 B2* | 9/2014 | Spindler | G01C 21/32 | 701/420 |
| 8,838,381 B1* | 9/2014 | Daily | G01C 21/3647 | 345/632 |
| 8,862,392 B2* | 10/2014 | Spindler | G01C 21/3638 | 701/436 |
| 8,880,343 B2* | 11/2014 | Spindler | G01C 21/3673 | 701/532 |
| 8,913,083 B1 | 12/2014 | Ogale | | |
| 9,406,153 B2 | 8/2016 | Williams | | |
| 9,488,488 B2* | 11/2016 | Waldman | G01C 21/3602 | |
| 9,583,074 B2* | 2/2017 | Chau | G09G 5/377 | |
| 9,646,422 B2* | 5/2017 | Fedosov | G06F 3/011 | |
| 9,672,588 B1 | 6/2017 | Doucette | | |
| 10,037,627 B2* | 7/2018 | Hustad | G06T 19/006 | |
| 10,445,772 B1* | 10/2019 | Chau | G06T 11/60 | |
| 2003/0080958 A1* | 5/2003 | Matsumoto | G06T 15/405 | 345/421 |
| 2004/0051680 A1* | 3/2004 | Azuma | G03B 13/28 | 345/8 |
| 2004/0249565 A1* | 12/2004 | Park | G01C 21/36 | 701/410 |
| 2005/0035883 A1* | 2/2005 | Kameda | G01C 21/3638 | 340/995.1 |
| 2006/0238379 A1 | 10/2006 | Kimchi | | |
| 2006/0287819 A1* | 12/2006 | Brulle-Drews | G01C 21/3638 | 701/431 |
| 2007/0027591 A1* | 2/2007 | Goldenberg | G06F 16/9537 | 701/23 |
| 2008/0268876 A1* | 10/2008 | Gelfand | G06Q 30/02 | 455/457 |
| 2009/0216446 A1* | 8/2009 | Ma | G01C 21/20 | 701/469 |
| 2009/0319178 A1 | 12/2009 | Khosravy et al. | | |
| 2009/0324137 A1* | 12/2009 | Stallings | H04N 5/23229 | 382/306 |
| 2010/0017124 A1* | 1/2010 | Zhao | G01C 21/165 | 701/455 |
| 2010/0070162 A1* | 3/2010 | Aihara | G01C 21/3632 | 701/533 |
| 2010/0118025 A1 | 5/2010 | Smith | | |
| 2010/0188355 A1* | 7/2010 | Sugita | G06F 3/012 | 345/173 |
| 2010/0191459 A1* | 7/2010 | Carter | G01C 21/32 | 701/532 |
| 2011/0102637 A1* | 5/2011 | Lasseson | G01C 21/3647 | 348/239 |
| 2011/0137561 A1 | 6/2011 | Kankainen | | |
| 2011/0141254 A1* | 6/2011 | Roebke | G06T 19/006 | 348/61 |
| 2012/0026108 A1* | 2/2012 | Sugita | G06F 3/005 | 345/173 |
| 2012/0176410 A1* | 7/2012 | Meier | G06F 3/147 | 345/633 |
| 2015/0116360 A1 | 4/2015 | Jones | | |
| 2015/0141060 A1 | 5/2015 | Shan et al. | | |
| 2016/0240011 A1* | 8/2016 | Fedosov | G06F 3/011 | |

FOREIGN PATENT DOCUMENTS

| | | |
|---|---|---|
| CN | 104160369 | 11/2014 |
| CN | 104376007 | 2/2015 |
| CN | 105160327 | 12/2015 |
| CN | 107656961 | 2/2018 |
| JP | 2011022112 | 2/2011 |
| KR | 20110001093 A | 1/2011 |
| TW | 201221912 | 6/2012 |
| TW | 201233216 | 8/2012 |
| TW | I405029 | 8/2013 |
| TW | 201512630 | 4/2015 |
| WO | WO 2016036311 | 3/2016 |

OTHER PUBLICATIONS

Extended European Search Report in European Patent Application No. 18841925.3, dated Jan. 30, 2020, 9 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/098249, dated Nov. 7, 2018, 9 pages (with partial English translation).

GitHub.com [online], "ibeacon-client," Nov. 12, 2017, retrieved on Dec. 4, 2019, retrieved from URL<https://github.com/app-bootstrap/ibeacon-client>, 2 pages.

Haines et al., "Recognizing Planes in a Single Image", IEEE Transactions on Pattern Analysis and Machine Intelligence, 37(9): 1849-1681, 2015.

* cited by examiner

INFORMATION DISPLAY METHOD AND APPARATUS

CROSS-REFERENCE TO RELATED APPLICATIONS

This application is a continuation of PCT Application No. PCT/CN2018/098249, filed on Aug. 2, 2018, which claims priority to Chinese Patent Application No. 201710662516.6, filed on Aug. 4, 2017, and each application is hereby incorporated by reference in its entirety.

TECHNICAL FIELD

The present application relates to the field of information technologies, and in particular, to an information display method and apparatus.

BACKGROUND

Currently, when obtaining information from a network, a user usually can use an end-user device to obtain required information from a platform that provides the information (for example, a search site, a portal site, or a site providing information). In addition, with an improvement to performance of mobile devices, the user also obtains information offline in a variety of methods.

For example, the user can determine a geographic location of a mobile device by using a Global Positioning System (GPS) chip on the mobile device, and further determine information (for example, information of interest to the user) about a nearby site of the mobile device. Alternatively, by using a Near Field Communication (NFC) chip of the mobile device, the user obtains other information stored in an NFC chip or an electronic label.

Further, with continuous improvements to an electronic map, more points of interest (POI) are marked on the electronic map. In addition, the user can perform an operation (for example, a tap gesture operation) on the POI on the electronic map, and obtain information included in the POI. Based on the existing technology, the present application provides a new information display method.

SUMMARY

Implementations of the present specification provide an information display method and apparatus, to provide another method for information acquisition and to improve user experience.

The following technical solutions are used in the implementations of the present specification: determining an image capturing direction of an end-user device and a geographic location of the end-user device when the end-user device captures an image; determining, based on the geographic location and the image capturing direction of the end-user device and a geographic location of each point of interest (POI), a POI that the end-user device points to when capturing the image; and rendering labeled data corresponding to the determined POI onto the image.

An information display apparatus is provided, including: a first determining module, configured to determine an image capturing direction of the apparatus and a geographic location of the apparatus when the apparatus captures an image; a second determining module, configured to determine, based on the geographic location and the image capturing direction of the apparatus and a geographic location of each point of interest (POI), a POI that the apparatus points to when capturing the image; and a rendering module, configured to render labeled data corresponding to the determined POI onto the image.

An end-user device is provided, where the end-user device includes one or more processors and a memory, where the memory stores a program, and the one or more processors are configured to perform the following steps: determining an image capturing direction of the end-user device and a geographic location of the end-user device when the end-user device captures an image; determining, based on the geographic location and the image capturing direction of the end-user device and a geographic location of each point of interest (POI), a POI that the end-user device points to when capturing the image; and rendering labeled data corresponding to the determined POI onto the image.

The at least one technical solution used in the implementations of the present specification can achieve the following benefits:

According to the method provided in the present specification, labeled data corresponding to a POI included in an image captured by using the end-user device can be rendered onto the image, so that a user can intuitively observe the POI in the image. As such, the user obtains information in more abundant methods, and the information is displayed to the user intuitively and conveniently, thereby improving user experience.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

With popularization of a network, a user can query various information over the network. For example, the user can query discount information from a merchant, introduction information of the merchant, address information, etc. on a personal computer. Usually, the user can obtain merchant information through pre-departure acquisition and post-departure acquisition. For the former, the user plans to obtain the merchant information and arranges a departure. In such a case, the user has a relatively clear target. However, for the latter, the user usually wants to view introductions, discount information, etc. of nearby merchants in a site such as a shopping mall or a business area spontaneously after a departure. In such a case, the user usually has no clear query target.

In the existing technology, when a user obtains information after a departure, the user can use an end-user device to obtain content information included in a POI stored on an electronic map. The content information included in the POI on the electronic map is usually related to a geographic location of the POI. Therefore, the content information included in the POI is usually information applicable to an offline scenario, for example, an offline used electronic coupon or promotion information of an online shop. However, the POI is usually displayed on the electronic map, and it is difficult to intuitively provide a specific location of the POI for the user.

Therefore, after obtaining the content information included in the POI on the electronic map, the user usually can determine, based on the electronic map, only a location relationship between the user and the POI and a route of moving to a geographic location of the POI, and when moving to a nearby site of the geographic location of the POI, search for an actual location corresponding to the POI (for example, an actual location of a shop or an actual location of a restaurant). Consequently, user experience is poor. Therefore, an implementation of the present specification provides an information display method, to intuitively and conveniently display information to a user, and improve user experience.

To make the objectives, technical solutions, and advantages of the present specification clearer, the following clearly describes the technical solutions of the present application with reference to specific implementations and corresponding accompanying drawings. Apparently, the described implementations are merely some rather than all implementations of the present application. All other implementations obtained by a person of ordinary skill in the art based on the implementations of the present specification without creative efforts shall fall within the protection scope of the present application.

The technical solutions provided in the implementations of the present specification are described in detail below with reference to the accompanying drawings.

Figure 1:
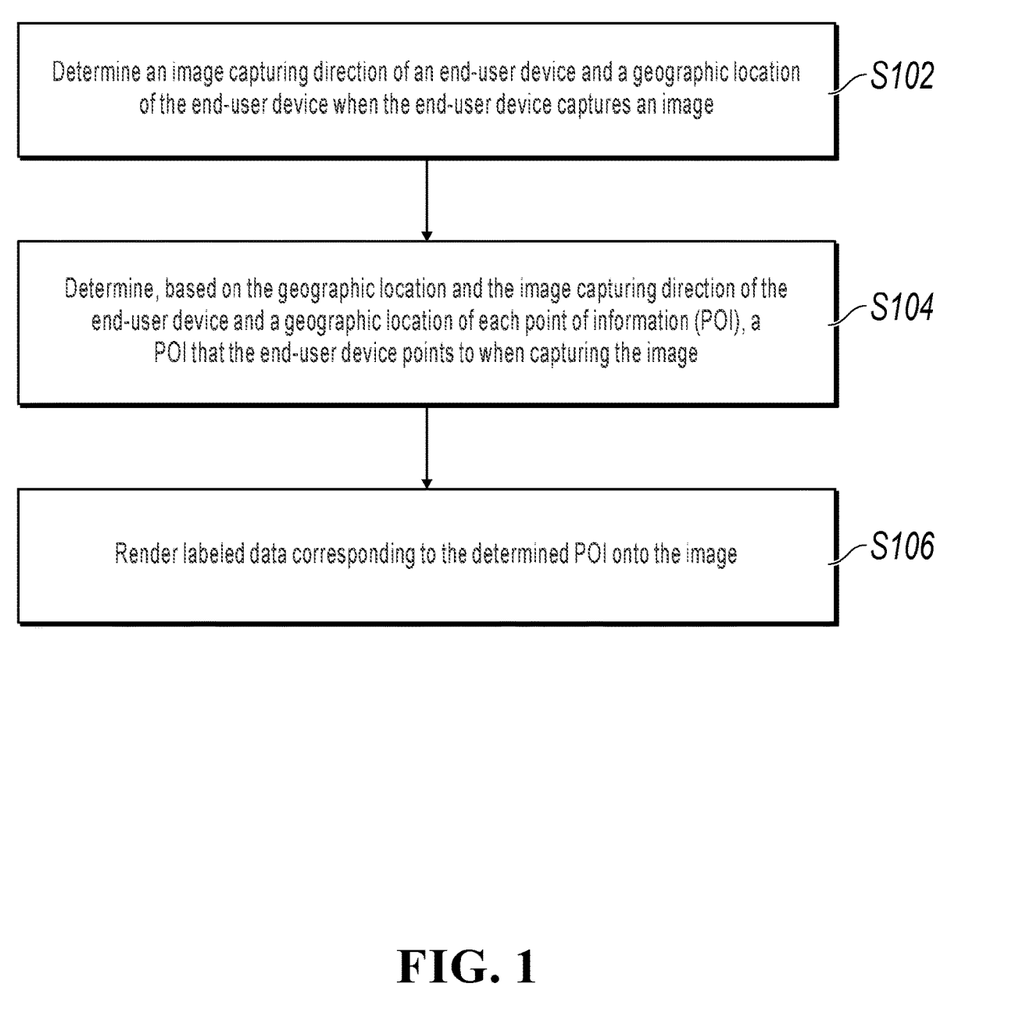
FIG. 1 shows an information display process according to an implementation of the present specification.

FIG. 1 shows an information display process, according to an implementation of the present specification. The process can include the following steps.

S102: Determine an image capturing direction of an end-user device and a geographic location of the end-user device when the end-user device captures an image.

In one or more implementations of the present specification, the end-user device can enable a camera in the end-user device based on an operation of a user, and captures the image by using the camera. Therefore, when capturing the image, the end-user device can further determine the image capturing direction of the end-user device and the geographic location of the end-user device, to render labeled data corresponding to a POI onto the image by performing subsequent steps. As such, intuitive experience is provided for the user, and the user can intuitively determine a location of the POI based on the labeled data corresponding to the POI displayed in the image. The image capturing direction of the end-user device can be an image capturing direction in which the end-user device captures the image and that is used when the end-user device captures the image.

The end-user device can be a mobile device, for example, a mobile phone or a tablet computer. The end-user device can include a camera, and the end-user device can capture the image by using the camera.

In addition, in one or more implementations of the present specification, a client can be further installed in the end-user device, and the client can be an application installed in the end-user device, and can obtain data over a network. In addition, the client can invoke, by using an application programming interface (API) disposed in the client in advance, the camera of the end-user device to capture the image. In such a case, after detecting that the user performs a camera enabling operation in the client, the client can determine that the user needs to obtain information included in a nearby POI. Therefore, the client invokes, by using the API, the camera of the end-user device to capture the image, and determines the image capturing direction of the end-user device and the geographic location of the end-user device to perform the subsequent steps. It is worthwhile to note that in the present implementation of the specification, the client installed in the end-user device can perform the information display process, an operating system of the end-user device can perform the information display process, hardware of the end-user device can perform the information display process, etc. Implementations are not limited in the specification. Certainly, for ease of description, in the following implementation of the present specification, descriptions are provided by using an example that the end-user device performs the information display process.

In the present implementation of the present specification, the image captured by the end-user device can be a separate image, or can be one of a plurality of frames of images in a video. Therefore, in the present implementation of the present specification, the end-user device can capture a video, and any frame of image in the video can be used as the image captured by the end-user device. Further, when capturing the image, the end-user device can further determine the geographic location and the image capturing direction of the end-user device by using data collected by a sensor. The sensor can include a GPS chip, a gyroscope, etc. The end-user device can determine, based on data collected by the gyroscope, the image capturing direction in which the end-user device captures the image. In addition, the end-user device can determine the geographic location of the end-user device based on at least one of data collected by the GPS chip, a received Bluetooth beacon signal, or a Wireless Fidelity (Wi-Fi) signal.

In the present implementation of the present specification, the end-user device can determine, by using data collected by the GPS chip, the geographic location of the end-user device in a method the same as a location based service (LBS) in the existing technology. In addition, in addition to determining the geographic location of the end-user device by using the GPS chip, to improve precision of the determined geographic location, the end-user device can determine the geographic location of the end-user device in a method the same as an existing Wireless Fidelity (Wi-Fi) or Bluetooth beacon (Bluetooth Beacon) positioning technology. Certainly, the end-user device can determine the geographic location of the end-user device by using one of the previous methods or a combination of a plurality of methods in the previous methods. The geographic location information can be a coordinate point or a geographic range.

Figure 4:
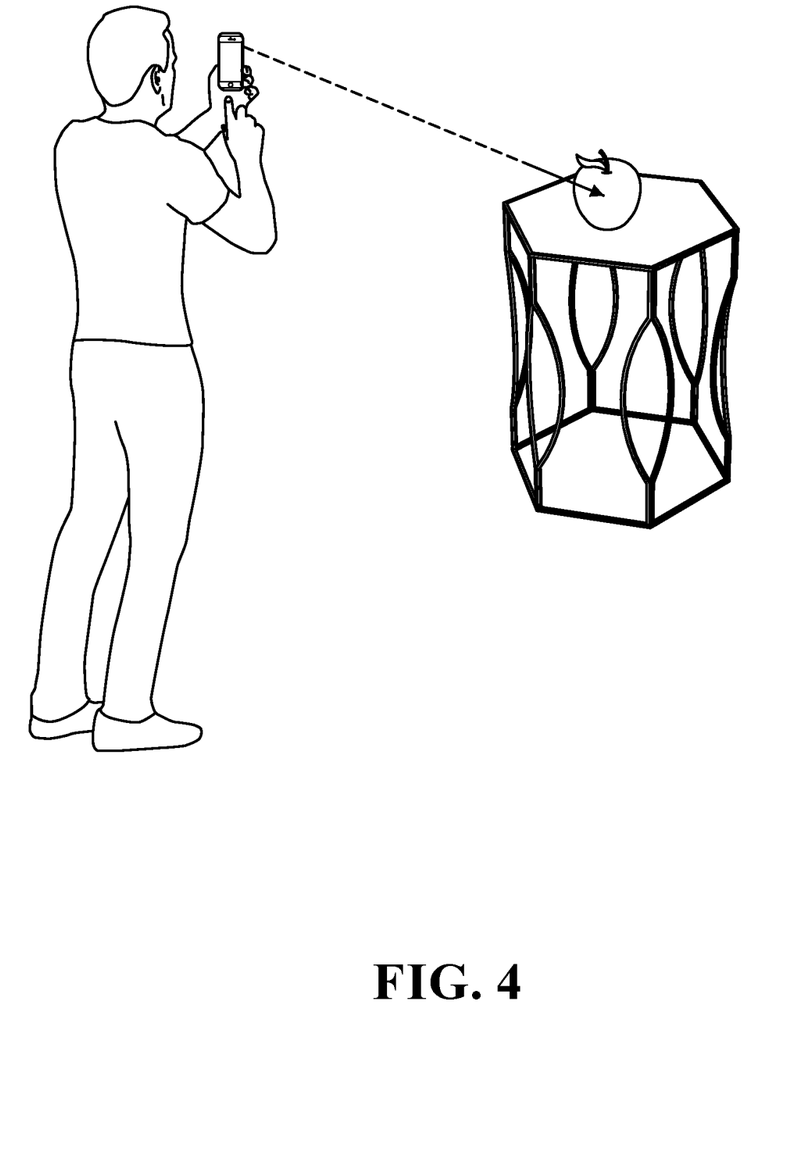
FIG. 4 is a schematic diagram illustrating a camera orientation, according to an implementation of the present specification.

Further, in the present implementation of the present specification, the end-user device can further determine, in a method the same as that in the existing technology by using the data collected by the gyroscope, the image capturing direction in which the end-user device captures the image. When the image is captured by using the camera of the end-user device, the image capturing direction can be a camera orientation. That is, in the present implementation of the present specification, the image capturing direction can be considered as the camera orientation, as shown in FIG. 4. In FIG. 4, when the user photographs an apple on a table, the image capturing direction is the camera orientation, that is, a direction of a dashed arrow. In addition, usually, the gyroscope can continuously collect angular velocity data of three-dimensional coordinates. Therefore, the end-user device can continuously determine an image capturing direction of the end-user device in a three-dimensional coordinate system.

In addition, the end-user device usually captures an image by using the camera, and the gyroscope is usually used to determine a direction of the end-user device. Therefore, when the image capturing direction is determined by using the gyroscope, the camera orientation in which the camera captures the image, that is, the image capturing direction can be determined based on a location relationship between the end-user device and the camera (the location relationship is usually fixed; for example, a camera is usually located on a top of the back of a mobile device) and the direction of the end-user device that is determined by using the gyroscope.

In addition, in order that the end-user device determines a more accurate image capturing direction, the end-user device can determine the image capturing direction of the end-user device by using data collected by an inertial measurement unit (IMU) or a three-dimensional electronic compass. Implementations are not limited in the present specification.

It is worthwhile to note that the POI generally includes: latitude and longitude, an identifier, a type, and content information. The latitude and longitude represent a geographic location of the POI, the identifier indicates a name of the POI, the type indicates a type corresponding to the POI (for example, a POI of a vehicle repair shop or a POI of a restaurant), and the content information can be any information added based on a demand. Certainly, there is no standard in a type of an existing POI. Therefore, the type can be set based on a demand of an actual application. For example, classification is performed based on a type of the content information (such as text information or picture information). Implementations are not limited in the present implementation of the present specification.

S104: Determine, based on the geographic location and the image capturing direction of the end-user device and a geographic location of each point of interest (POI), a POI that the end-user device points to when capturing the image.

In one or more implementations of the present specification, after determining the geographic location of the end-user device, the end-user device can send the geographic location to a server. The server can be a server that provides an electronic map service. In such a case, the server determines, based on a geographic location of each prestored POI, a POI within a specified distance from the geographic location of the end-user device, and returns the POI. The end-user device can further determine, based on a geographic location of each POI returned by the server, and the geographic location and the image capturing direction that are of the end-user device and that are determined in step S102, the POI that the end-user device points to when capturing the image.

In addition, the end-user device can alternatively obtain, in advance from the server, each POI stored by the server. In such a case, in step S104, the end-user device can determine, without sending the geographic location of the end-user device to the server, the POI that the end-user device points to when capturing the image. A specific method is not limited in the present specification.

Descriptions are provided by using an example that the POI that the end-user device points to when capturing the image is determined based on the geographic location of each POI returned by the server, and the geographic location and the image capturing direction of the end-user device.

First, the end-user device can send the geographic location determined in step S102 to the server, and the server can determine, from all the POIs based on the geographic location of each stored POI, the POI within the specified distance from the geographic location of the end-user device. The specified distance can be preset in the server, or can be sent by the end-user device to the server. In such a case, the specified distance can be set in the end-user device or the server based on a demand (for example, the specified distance is 50 meters or 10 meters).

Figure 2:
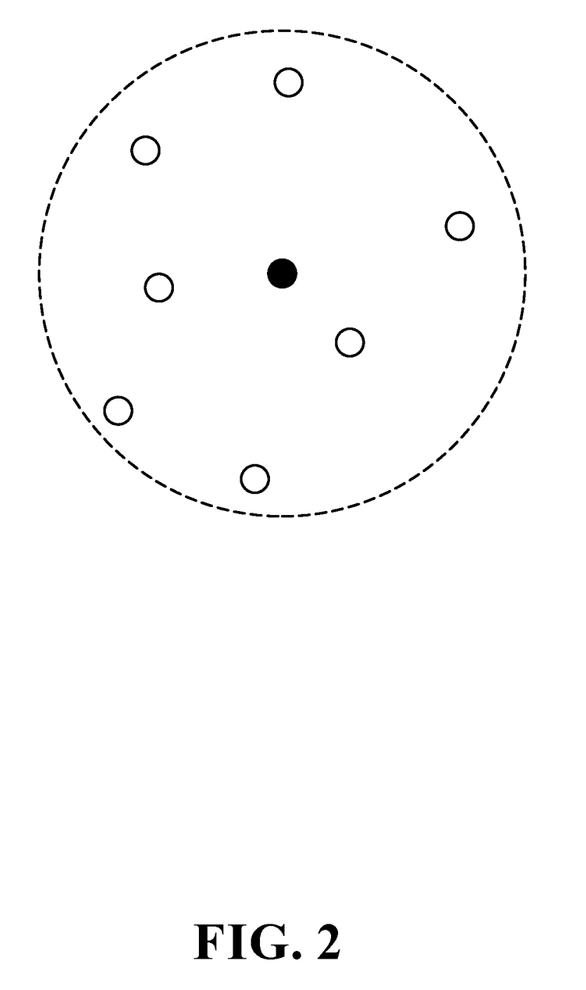
FIG. 2 is a schematic diagram illustrating POIs surrounding a geographic location of an end-user device, according to an implementation of the present specification.

Because the geographic location of the POI determined by the server falls within the specified distance from the geographic location of the end-user device, the POI returned by the server usually surrounds the geographic location of the end-user device, as shown in FIG. 2. A black dot identifies the geographic location of the end-user device, a white dot indicates the geographic location of the POI returned by the server, and a dashed circle indicates a circle that uses the geographic location of the end-user device as a center and uses the specified distance as a radius.

Figure 3:
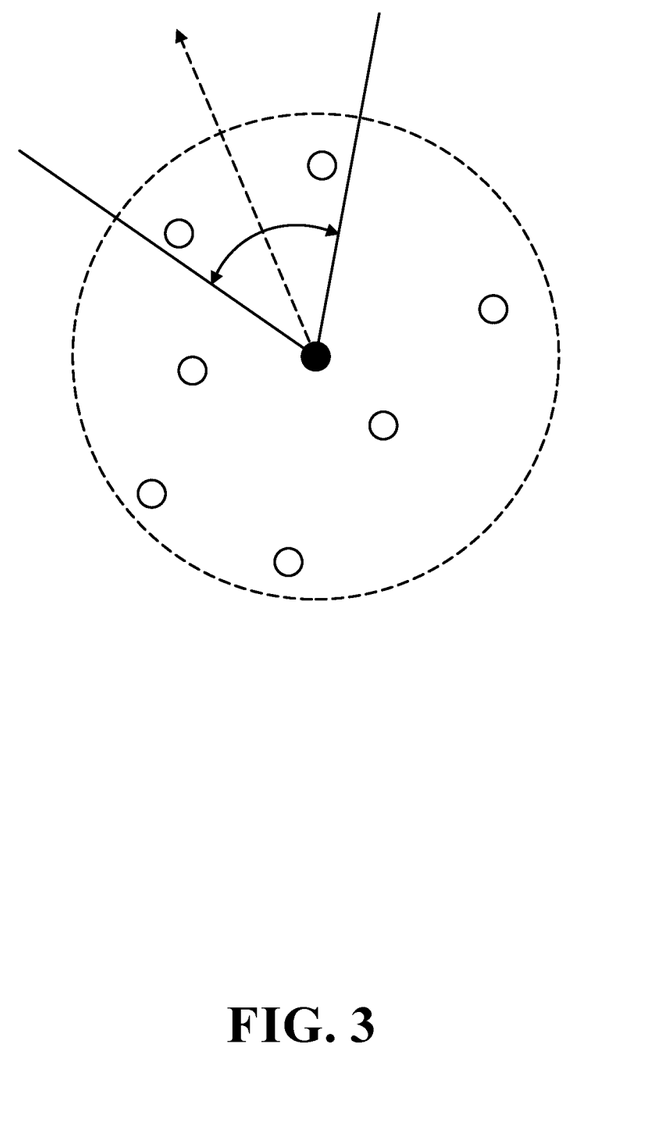
FIG. 3 is a schematic diagram illustrating a visual angle range of an end-user device, according to an implementation of the present specification.

Then, the end-user device can further determine, from all received POIs by using the geographic location of the end-user device as an origin of a coordinate system, using the image capturing direction as a center line, and using a preset visual angle range, the POI that the end-user device points to when capturing the image. Subsequently, labeled data corresponding to the POI determined in step S104 needs to be rendered onto the captured image, and the camera that captures the image has a visual angle range. Therefore, the end-user device can determine a POI within the visual angle range of the camera in an upward direction based on the visual angle range (that is, the preset visual angle range) of the camera from all POIs returned by the server, and the POI is used as the POI that the end-user device points to when capturing the image, as shown in FIG. 3. A dashed straight arrow represents a center line of the visual angle range, a curved double-headed arrow represents the visual angle range, and a straight line represents a boundary of the visual angle range. It is worthwhile to note that different cameras have different focal segments and a focal segment of the camera is available, and therefore, the preset visual angle range can be determined based on the focal segment of the camera.

In addition, the server that provides the electronic map service can further provide an indoor electronic map service, and a POI in an indoor electronic map generally further includes floor height information. For example, when a shopping mall includes three floors, the indoor electronic map can be divided into the first floor, the second floor, and the third floor. Therefore, in the present implementation of the present specification, the geographic location of the end-user device can further include an altitude, and each POI can further include floor height information. Therefore, when determining the POI within the specified distance from the geographic location of the end-user device, the server can further determine, based on floor height information included in the stored POI, a POI that is at the same floor height as the altitude of the end-user device and that falls within the specified distance from the geographic location.

Further, when the end-user device is up and down, the end-user device can capture an image of a previous floor or a next floor (for example, capture an image of a patio). Therefore, in the present implementation of the present specification, the server can further determine a POI at a neighboring floor height of the altitude of the geographic location.

S106: Render labeled data corresponding to the determined POI onto the image.

In one or more implementations of the present specification, after the POI that the end-user device points to when capturing the image is determined, the labeled data corresponding to the determined POI can be rendered onto the image, so that the user can intuitively observe, from the captured image, a location at which there is a POI. Subsequently, the content information included in the POI can be provided for the user intuitively, so that the user obtains information more conveniently, and user experience is improved.

The end-user device can render, using a method for converting a 3D model into a 2D graphics in the existing technology, the labeled data corresponding to the determined POI onto the image. First, the end-user device can determine a horizontal plane in the captured image based on a preset horizontal plane recognition algorithm in a method the same as that in the existing technology. As such, after a space model is established subsequently, a location at which the labeled data corresponding to the POI is rendered can be determined based on the horizontal plane in the image.

Then, the end-user device can establish the space model by using the geographic location of the end-user device as an origin of a coordinate system; establish, based on the geographic location of the determined POI and a relative location relationship between the geographic location of each POI and the geographic location of the end-user device, coordinates of labeled data corresponding to each POI in the space model; and establish a virtual camera in the space model based on the geographic location and the image capturing direction of the end-user device, and determine coordinates of the virtual camera. The virtual camera is configured to simulate the camera of the end-user device in the space model. That is, in the space model, relative locations and relative directions of the virtual camera and the labeled data corresponding to each POI are the same as relative locations and relative directions of the geographic location of the end-user device and the geographic location of each POI in an actual scenario. It can also be considered that re-establishment is performed in the space model based on the relative locations and the relative directions of the end-user device and each POI in the actual scenario.

Then, the end-user device can determine, through coordinate transformation based on the space model, the coordinates of the virtual camera (including a relative location and a relative direction), and coordinates of each POI, an image of the space model that is captured by the virtual camera.

Then, because the labeled data corresponding to each POI needs to be rendered onto the captured image, the determined horizontal plane in the captured image can be used as a horizontal plane of the space model, and a location that is in the image captured by the end-user device and that is of the labeled data corresponding to each POI in the image of the space model that is captured by the virtual camera is determined through coordinate transformation.

Figure 5:
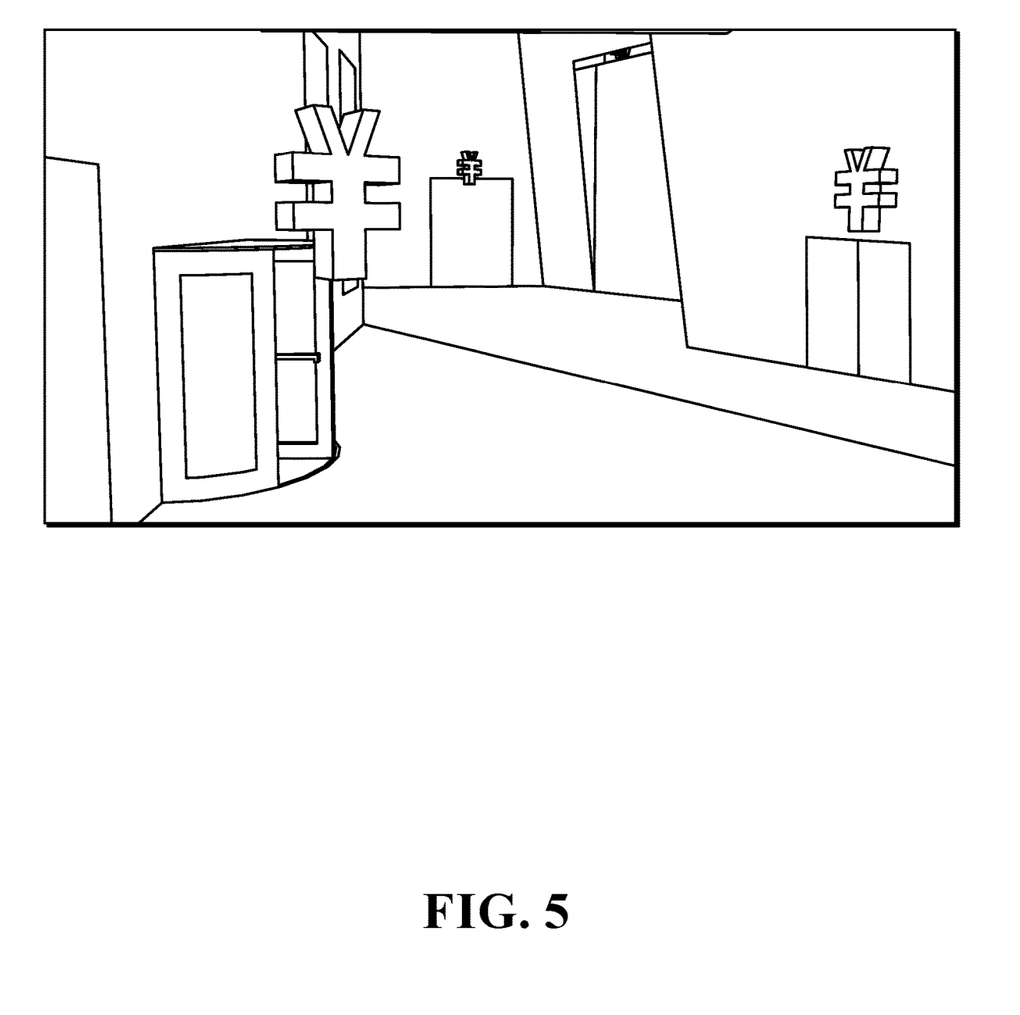
FIG. 5 is a schematic diagram illustrating rendering labeled data onto an image, according to an implementation of the present specification.

Finally, the labeled data corresponding to each POI is rendered onto the image, as shown in FIG. 5. The labeled data corresponding to each POI can be set collectively, for example, a symbol "v" shown in FIG. 5. Alternatively, the labeled data corresponding to each POI can also be data included in the POI. Therefore, when determining each POI, the end-user device can further determine the labeled data included in the POI, to render the labeled data onto the image.

According to the information display process shown in FIG. 1, when the end-user device captures the image, the image capturing direction in which the end-user device captures the image and the geographic location of the end-user device can be determined. Then, the POI that the end-user device points to when capturing the image can be determined based on each POI, the geographic location, and the image capturing direction. Finally, the labeled data corresponding to the determined POI is rendered onto the image. By using the information display process provided in the present specification, information included in the corresponding POI can be intuitively displayed in the image captured by the end-user device, so that the user can intuitively determine information about a nearby POI. As such, more convenient and more abundant information acquisition methods are obtained, and user experience is improved.

In addition, in the present implementation of the present specification, after the end-user device renders the labeled data corresponding to each determined POI onto the image, the end-user device can further detect an operation of the user on the labeled data that corresponds to each POI and that is rendered onto the image. When detecting an operation on any piece of labeled data rendered onto the image, the end-user device can further display content information included in a POI corresponding to the labeled data. The operation can be a gesture operation of the user, for example, a tap gesture operation or a slide gesture operation. The content information included in the POI can be electronic coupon information, for example, a coupon or discount information. Implementations are not limited in the present specification. In the present implementation of the present specification, when the user shops in the shopping mall, and captures an image by using the end-user device, the end-user device can render labeled data corresponding to a POI in an image capturing direction onto the image, so that the user can intuitively determine, from the image, a location at which there is a POI, and the user can further obtain, through operations such as a tap operation, content information included in the POI. As such, the user obtains information more conveniently and intuitively, and user experience is improved.

Further, when determining the camera orientation in step S102, in addition to determining the orientation of the end-user device based on the IMU, the client can calculate and determine, in a method the same as that in the existing technology by using the image recognition algorithm, the image capturing direction in which the end-user device captures the image. Implementations are not limited in the present specification.

Certainly, in one or more implementations of the present specification, the end-user device can determine the image capturing direction in one of the previous methods or a combination of a plurality of the previous methods. Implementations are not limited in the present specification.

It is worthwhile to note that all the steps of the method provided in the present implementation of the present specification can be performed by a same device, or the method can be performed by different devices. For example, step S102 and step S104 can be performed by device 1, and step S106 can be performed by device 2. For another example, step S102 and step S106 can be performed by device 2, and step S104 can be performed by device 1. Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order or a sequential order to achieve the desired results. In some implementations, multitasking processing and parallel processing can be advantageous.

Figure 6:
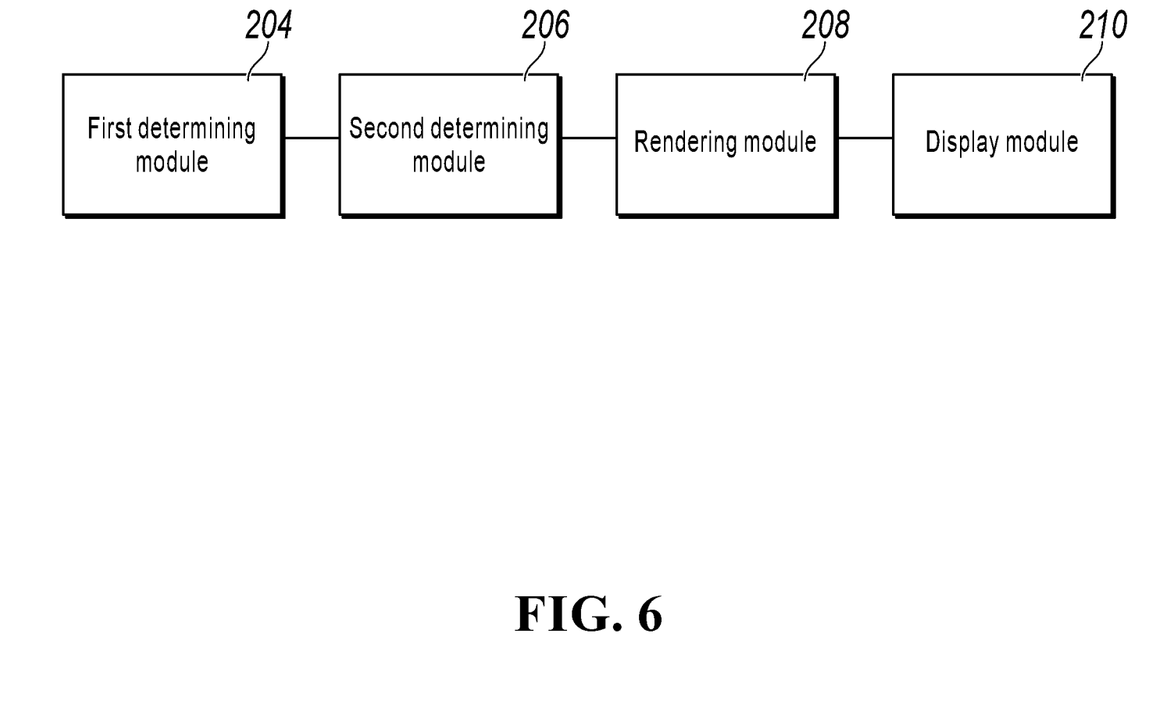
FIG. 6 is a schematic structural diagram illustrating an information display apparatus, according to an implementation of the present specification.

Based on the information display method shown in FIG. 1, an implementation of the present specification further provides a schematic structural diagram illustrating a corresponding information display apparatus, as shown in FIG. 6.

FIG. 6 is a schematic structural diagram illustrating an information display apparatus, according to an implementation of the present specification. The apparatus includes: a first determining module 204, configured to determine an image capturing direction of the apparatus and a geographic location of the apparatus when the apparatus captures an image; a second determining module 206, configured to determine, based on the geographic location and the image capturing direction of the apparatus and a geographic location of each point of interest (POI), a POI that the apparatus points to when capturing the image; and a rendering module 208, configured to render labeled data corresponding to the determined POI onto the image.

The second determining module 206 is configured to: send the geographic location of the apparatus to a server, so that the server determines, based on a geographic location of each prestored POI, a POI within a specified distance from the geographic location of the apparatus, and returns the POI; and determine, based on a geographic location of each POI returned by the server, the geographic location of the apparatus, and the image capturing direction, the POI that the apparatus points to when capturing the image.

The rendering module 208 is configured to: determine a horizontal plane in the image based on a preset horizontal plane recognition algorithm; determine a location of the determined POI in the image based on the horizontal plane in the image, the geographic location of the apparatus, the image capturing direction, and a geographic location of the determined POI; and render, based on the location of the determined POI in the image, the labeled data corresponding to the determined POI onto the image.

The apparatus further includes: a display module 210, configured to: for each POI whose corresponding labeled data is rendered onto the image, when an operation on the labeled data that corresponds to the POI and that is rendered onto the image is detected, display content information included in the POI.

When the operation on the labeled data that corresponds to the POI and that is rendered onto the image is detected, the display module 210 is configured to send an identifier of the POI to a server, so that the server marks a display method used when the POI is operated.

The content information included in the POI is electronic coupon information.

The first determining module 204 can determine, based on data collected by an inertial measurement unit (IMU), the image capturing direction used when the apparatus captures the image.

The first determining module 204 can determine the geographic location of the apparatus based on at least one of data collected by a Global Positioning System (GPS) chip, a received Bluetooth beacon signal, or a Wireless Fidelity (Wi-Fi) signal.

The display apparatus can be located in a mobile device, for example, a mobile phone or a tablet computer.

Figure 7:
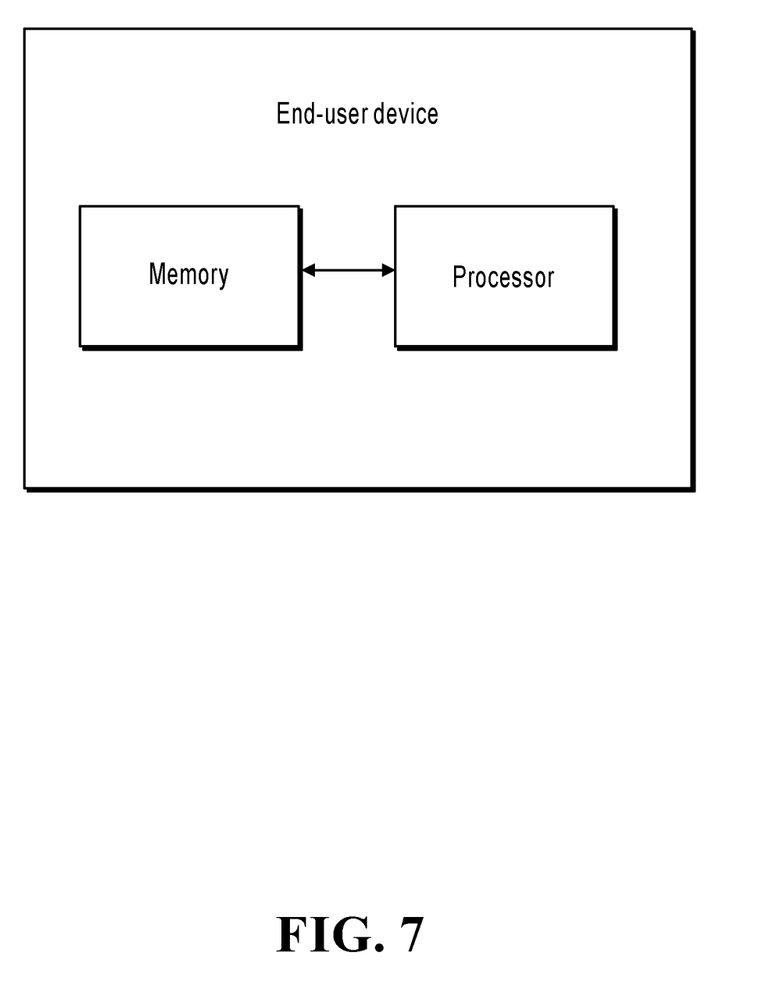
FIG. 7 is a schematic structural diagram illustrating an end-user device, according to an implementation of the present specification.

Based on the information display method shown in FIG. 1, an implementation of the present specification further provides a schematic structural diagram illustrating a corresponding end-user device, as shown in FIG. 7.

FIG. 7 is a schematic structural diagram illustrating an end-user device, according to an implementation of the present specification. The end-user device includes one or more processors and a memory. The memory stores a program, and the one or more processors are configured to perform the following steps: determining an image capturing direction of the end-user device and a geographic location of the end-user device when the end-user device captures an image; determining, based on the geographic location and the image capturing direction of the end-user device and a geographic location of each point of interest (POI), a POI that the end-user device points to when capturing the image; and rendering labeled data corresponding to the determined POI onto the image.

It is worthwhile to note that all the implementations of the present specification are described in a progressive way. For same or similar parts of the implementations, references can be made to the implementations. Each implementation focuses on a difference from other implementations. In particular, the mobile device and the server that are provided in the implementations of the present application are basically similar to the method implementation, and therefore, are described relatively briefly. For related parts, references can be made to some descriptions in the method implementation.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler (logic compiler)" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate method. For example, the controller can be a microprocessor or a processor, or a computer readable medium that stores computer readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microcontrollers: ARC 625D, Atmel AT91SAM, Microchip PIC18F26K20, and Silicone Labs C8051F320. A memory controller can also be implemented as a part of the control logic of a memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, the built-in microcontroller, etc. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present application is implemented, a function of each unit can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer readable memory that can instruct the computer or the another programmable data processing device to work in a specific way, so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible to the computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so that a process, a method, a product, or a device that includes a list of elements not only includes those elements but also includes other elements which are not expressly listed, or further includes elements inherent to such process, method, product, or device. Without more constraints, an element preceded by "includes a . . . " does not preclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk memory, a CD-ROM, an optical memory, etc.) that include computer-usable program code.

The present application can be described in the general context of computer executable instructions executed by a computer, for example, a program module. Generally, the program module includes a routine, a program, an object, a component, a data structure, etc. executing a specific task or implementing a specific abstract data type. The present application can also be practiced in distributed computing environments. In the distributed computing environments, tasks are performed by remote processing devices connected through a communications network. In the distributed computing environment, the program module can be located in both local and remote computer storage media including storage devices.

All the implementations of the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   determining an image capturing direction of an end-user device;
   determining a geographic location of the end-user device when the end-user device captures a first image;
   determining, based on the geographic location and the image capturing direction of the end-user device and a geographic location of at least one point of interest (POI), from the at least one POI, a first POI that the end-user device points to when capturing the first image, comprising:
      determining the first POI is within a virtual angle range of the end-user device based on a focal segment of the end-user device;
   establishing a space model by using the geographic location of the end-user device as an origin of a coordinate system;
   determining based on the space model, coordinates of a virtual camera; and
   rendering labeled data corresponding to the first POI onto the first image by using a second image simulated by the virtual camera.

2. The computer-implemented method of claim 1, wherein determining, from the at least one POI, the first POI that the end-user device points to when capturing the first image further comprises:
   sending the geographic location of the end-user device to a server, so that the server determines, based on a geographic location of each prestored POI, a candidate POI within a specified distance from the geographic location of the end-user device, and returns the candidate POI; and
   determining, based on a geographic location of each candidate POI returned by the server, the first POI that the end-user device points to when capturing the first image.

3. The computer-implemented method of claim 1, wherein rendering the labeled data corresponding to the first POI onto the first image comprises:
   determining a horizontal plane in the first image based on a preset horizontal plane recognition algorithm;
   determining a location of the first POI in the first image based on the horizontal plane in the first image, the geographic location of the end-user device, the first image capturing direction, and a geographic location of the first POI; and
   rendering, based on the location of the first POI in the first image, the labeled data corresponding to the first POI onto the first image.

4. The computer-implemented method of claim 1, further comprising:
   for each piece of labeled data rendered onto the first image, when an operation on the labeled data is detected, displaying content information comprised in the first POI corresponding to the labeled data.

5. The computer-implemented method of claim 4, wherein the content information comprises electronic coupon information.

6. The computer-implemented method of claim 1, wherein determining the coordinates of the virtual camera is based on a coordinate transformation using the space model.

7. A non-transitory, computer-readable medium storing one or more instructions executable by a computer system to perform operations, comprising:
   determining an image capturing direction of an end-user device;

determining a geographic location of the end-user device when the end-user device captures a first image;

determining, based on the geographic location and the image capturing direction of the end-user device and a geographic location of at least one point of interest (POI), from the at least one POI, a first POI that the end-user device points to when capturing the first image, comprising:

determining the first POI is within a virtual angle range of the end-user device based on a focal segment of the end-user device;

establishing a space model by using the geographic location of the end-user device as an origin of a coordinate system;

determining based on the space model, coordinates of a virtual camera; and rendering labeled data corresponding to the first POI onto the first image by using a second image simulated by the virtual camera.

8. The non-transitory, computer-readable medium of claim 7, wherein determining, from the at least one POI, the first POI that the end-user device points to when capturing the first image further comprises:

sending the geographic location of the end-user device to a server, so that the server determines, based on a geographic location of each prestored POI, a candidate POI within a specified distance from the geographic location of the end-user device, and returns the candidate POI; and determining, based on a geographic location of each candidate POI returned by the server, the first POI that the end-user device points to when capturing the first image.

9. The non-transitory, computer-readable medium of claim 7, wherein rendering the labeled data corresponding to the first POI onto the first image comprises:

determining a horizontal plane in the first image based on a preset horizontal plane recognition algorithm;

determining a location of the first POI in the first image based on the horizontal plane in the first image, the geographic location of the end-user device, the first image capturing direction, and a geographic location of the first POI; and rendering, based on the location of the first POI in the first image, the labeled data corresponding to the first POI onto the first image.

10. The non-transitory, computer-readable medium of claim 7, wherein the operations further comprise:

for each piece of labeled data rendered onto the first image, when an operation on the labeled data is detected, displaying content information comprised in the first POI corresponding to the labeled data.

11. The non-transitory, computer-readable medium of claim 10, wherein the content information comprises electronic coupon information.

12. The non-transitory, computer-readable medium of claim 7, wherein determining the coordinates of the virtual camera is based on a coordinate transformation using the space model.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:

determining an image capturing direction of an end-user device;

determining a geographic location of the end-user device when the end-user device captures a first image;

determining, based on the geographic location and the image capturing direction of the end-user device and a geographic location of at least one point of interest (POI), from the at least one POI, a first POI that the end-user device points to when capturing the first image comprising:

determining the first POI is within a virtual angle range of the end-user device based on a focal segment of the end-user device;

establishing a space model by using the geographic location of the end-user device as an origin of a coordinate system;

determining based on the space model, coordinates of a virtual camera; and rendering labeled data corresponding to the first POI onto the first image by using a second image simulated by the virtual camera.

14. The computer-implemented system of claim 13, wherein determining, from the at least one POI, the first POI that the end-user device points to when capturing the first image further comprises:

sending the geographic location of the end-user device to a server, so that the server determines, based on a geographic location of each prestored POI, a candidate POI within a specified distance from the geographic location of the end-user device, and returns the candidate POI; and determining, based on a geographic location of each candidate POI returned by the server, the first POI that the end-user device points to when capturing the first image.

15. The computer-implemented system of claim 13, wherein rendering the labeled data corresponding to the first POI onto the first image comprises:

determining a horizontal plane in the first image based on a preset horizontal plane recognition algorithm;

determining a location of the first POI in the first image based on the horizontal plane in the first image, the geographic location of the end-user device, the first image capturing direction, and a geographic location of the first POI; and rendering, based on the location of the first POI in the first image, the labeled data corresponding to the first POI onto the first image.

16. The computer-implemented system of claim 13, wherein the operations further comprise:

for each piece of labeled data rendered onto the first image, when an operation on the labeled data is detected, displaying content information comprised in the first POI corresponding to the labeled data.

17. The computer-implemented system of claim 16, wherein the content information comprises electronic coupon information.

* * * * *

UNITED STATES PATENT AND TRADEMARK OFFICE
CERTIFICATE OF CORRECTION

PATENT NO. : 11,212,639 B2
APPLICATION NO. : 16/597459
DATED : December 28, 2021
INVENTOR(S) : Dafeng Xu It is certified that error appears in the above-identified patent and that said Letters Patent is hereby corrected as shown below:

In the Claims

Column 18/Line 15 – In Claim 13, delete "image" and insert -- image, --.

Signed and Sealed this
Thirtieth Day of August, 2022

Katherine Kelly Vidal
*Director of the United States Patent and Trademark Office*